(12) United States Patent
Maher et al.

(10) Patent No.: US 6,313,415 B1
(45) Date of Patent: Nov. 6, 2001

(54) PULSE WIDTH MODULATED WEIGHING PLATFORM

(75) Inventors: James P. Maher, Milford; Kenneth G. Miller, Glastonbury; Edward R. Bass, Trumbull, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/475,357

(22) Filed: Dec. 30, 1999

(51) Int. Cl.⁷ ............................. G01G 19/34; G01G 3/14
(52) U.S. Cl. ................... 177/25.13; 177/210 R; 177/210 FP
(58) Field of Search .............. 177/210 R, 210 FP, 177/25.13

(56) References Cited

U.S. PATENT DOCUMENTS

| | | | |
|---|---|---|---|
| 4,730,499 | * | 3/1988 | Gianella et al. ............... 177/185 |
| 5,419,204 | * | 5/1995 | Yamaguchi et al. .......... 177/210 EM |
| 5,864,295 | * | 1/1999 | Jarocha ......................... 177/210 R |
| 5,877,637 | * | 3/1999 | Trofimenkoff et al. .......... 73/766 |
| 5,900,592 | * | 5/1999 | Sohns et al. .................. 177/210 R |

* cited by examiner

Primary Examiner—Randy W. Gibson
(74) Attorney, Agent, or Firm—Ronald Reichman; Michael E. Melton; Robert E. Meyer

(57) ABSTRACT

An electronic scale uses an analog signal from a load cell which is converted directly to a pulse width modulated output signal. This pulse width modulated output signal represents the weight of an object on the scale and is sufficient to be directly read by a typical microcontroller. Therefore, no amplifier or analog to digital converter is required. The microcontroller then converts a signal representing the weight of the object on the scale to a weight value. A method of using the counter/timers on the microcontroller with synchronized overflow, is disclosed to enable a high resolution value of the pulse width modulated signal, which is then converted into a weight value for object's weight given that the pulse width modulated output signal is proportional to the weight of an object placed on the load cell.

5 Claims, 10 Drawing Sheets

PULSE WIDTH MODULATED WEIGHING PLATFORM

TECHNICAL FIELD

The present invention relates to a method and apparatus for using an electronic scale to weigh articles.

BACKGROUND OF THE INVENTION

In the electronic scale art, see FIG. 1, it is known to send an analog signal from a load cell in response to an object being placed upon the load cell. The signal is then amplified and sent to an analog-to-digital converter. The digital output of the analog to digital converter, i.e., the signal representing the weight, is processed by a microcontroller and displayed to the user.

However, requiring a separate amplifier and a separate analog-to-digital converter increases the cost and complexity of an electronic scale. Additionally, standard timers/counters in typical microcontrollers have limitations which affect resolution particularly when one sole timer/counter is relied on. Therefore, achieving high resolution while using a less expensive, and a less complex, scale for weighing articles is desirable and needed in the art.

SUMMARY OF THE INVENTION

In the present invention, an analog signal from a load cell is converted, with circuitry on the load cell apparatus, directly to a pulse width modulated output signal which is suitable for reading by a microcontroller. This signal represents the weight of the article on the scale and it is directly readable by a microcontroller without amplification or analog to digital conversion. Therefore, an amplifier or an analog-to-digital converter is not required. This simplification greatly reduces the cost and complexity of the scale. Further, a method of combining the use of multiple timer/counters with different rates of operation on the microcontroller is incorporated into the operation of the scale which provides a high resolution signal required for a high resolution scale without requiring additional hardware. Therefore, the invention provides a much simpler, and much less costly, electronic scale apparatus than is known in the art while also enabling a method of generating high resolution data.

Therefore according to a first aspect of the invention an electronic scale for weighing an object placed thereon is provided. The electronic scale comprises a load cell with terminals for providing an output voltage proportional to the weight of the object placed on the load cell; a pulse width modulated signal generator responsive to the output voltage from the load cell so as to generate a pulse width modulated output signal responsive to said output voltage; and a microcontroller responsive to the pulse width modulated output signal generated by the pulse generator so as to generate a weight data having a value proportional to the duty cycle of the pulse width modulated output signal. The microcontroller may include programmable timer/counter arrays (PCAs) to time the pulse width modulated output signal used by the microcontroller to generate the weight data.

According to a second aspect of the invention, the scale may include a memory for the storage of a number of count overflows, wherein the microcontroller includes a first high resolution timer/counter and a second timer/counter, the first timer/counter is clocked to count at a faster rate than the second timer/counter, wherein the second timer/counter is preset with a predetermined count value so that it overflows at the same count value as the first timer/counter. The scale may also be configured so that the counts in the first and second timer/counters are stopped upon detection of a rising edge or falling edge transition in the pulse width modulated output signal and the value of the first timer/counter and the overflow value is saved as a representation of the pulse width of the High pulse or Low pulse respectively. The microcontroller may be an Intel® 8XC51FX based microcontroller or other microcontroller.

According to a third aspect of the invention, a method of connecting a load cell with a pulse width generator to a microcontroller is disclosed, comprising the steps of: placing an article on a load cell to generate an analog signal from the load cell which is proportional to a weight of the article placed on the load cell; sending the analog signal to a pulse width generator connected to the load cell which directly converts the analog signal to a pulse waveform signal which is readable by a microcontroller connected to the pulse width generator without amplification or use of an analog to digital converter.

According to a fourth aspect of the invention, a method for determining the weight of an article placed on a load cell is disclosed comprising the steps of: placing an article on the load cell to generate an analog signal from the load cell which is proportional to the weight of the article; sending the analog signal to a pulse width modulated signal generator which directly converts the analog signal to a pulse width modulated signal which is readable by a microcontroller, said pulse width modulated signal having a duty cycle proportional to the analog signal, said pulse width modulated signal generated without amplification or use of an analog to digital converter; wherein the pulse width modulated signal contains rising edges and falling edges which form a duty cycle proportional to the weight of the article placed on the load cell; sending the pulse width modulated signal to a Programmable Counter Array (PCA) capture module of a microcontroller to enable a first timer/counter and a second timer/counter in the microcontroller. This is accomplished by setting the first timer/counter and the second timer/counter to operate at different rates wherein the first timer/counter operates at a rate which is faster and has higher resolution than the second timer/counter; presetting the second timer/counter to a specific value such that it experiences overflow at the same time that the first timer/counter experiences overflow in a synchronized manner; starting the timer/counters upon detection of a rising edge or a falling edge by the Programmable Counter Array (PCA) capture module; interrupting upon overflow of the second timer/counter, incrementing an overflow count value of the second timer/counter in a memory, logically adding a synchronization value to the second timer to enable the second timer to remain synchronized with the first timer, and returning from interrupt; interrupting the timer/counters upon detection of a subsequent rising edge or a subsequent falling edge by the Programmable Counter Array (PCA) capture module; storing in a memory a value present in the first time/counter upon interrupt; combining the overflow count value of the second timer/counter with the value from the first timer/counter to form a value which represents the High or Low portion of the pulse width modulated signal. These High and Low data values are converted to a high resolution value in the microcontroller which represents a weight value for the article placed on the load cell. The microcontroller may operate at a predetermined frequency of oscillation (Fosc) wherein: the second timer/counter operates at the rate of Fosc divided by 4 (Fosc/4), and the first timer/counter operates at the rate of Fosc divided by 2 (Fosc/2).

DETAILED DESCRIPTION OF THE PREFERRED EMBODIMENT

Figure 1:
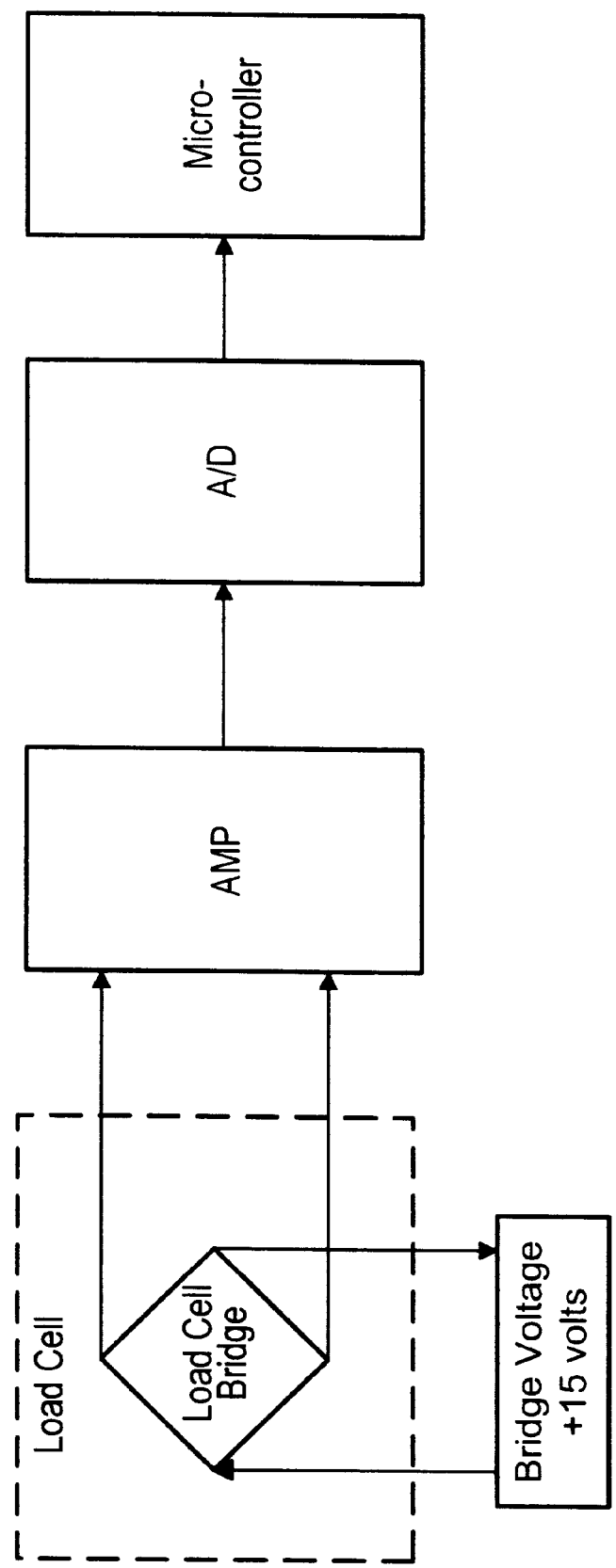
FIG. 1 is a block diagram of the prior art arrangement.
Figure 2:
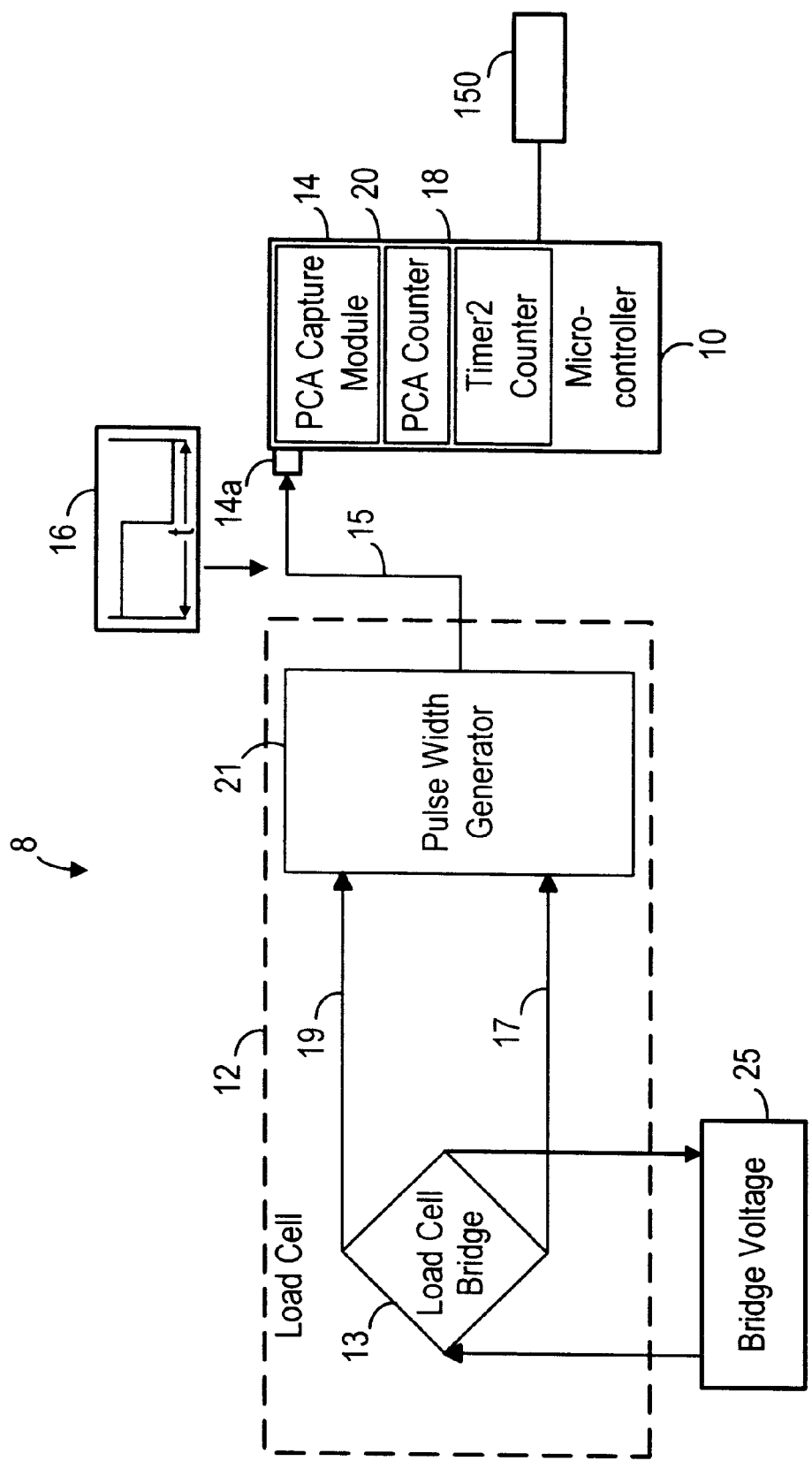
FIG. 2 is a block diagram of an arrangement of the present invention.

As seen in FIG. 2, an electronic scale 8 according to the present invention incorporates a pulse width modulated load cell module 12 and a microcontroller 10 connected thereto by bus 15. The microcontroller 10 is preferably an Intel 8×51FX based microcontroller or other microcontroller which includes programmable counter/timer array(s) (PCA) 14. The output from the pulse width modulated load cell module 12 is connected to a PCA capture module 14 input 14a on such a microcontroller 10. The pulse width modulated load cell module 12 includes a load cell bridge 13 connected to a voltage source 25. The load cell module 12 produces an output voltage on lines 17 and 19 that is proportional to the weight for an object (not shown) placed on the pulse width modulated load cell module 12. This output voltage is across lines 17 and 19 which are connected to a pulse width generator 21 forming part of the load cell module 12. The output signal of the pulse width generator is sent to microcontroller 10 via bus 15.

Figure 5:
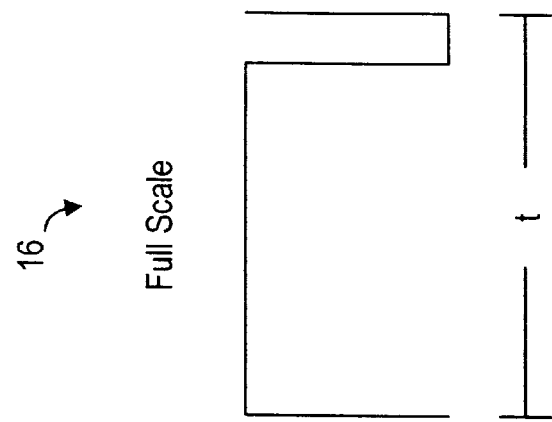
FIG. 5 is a diagram of the shape of a pulse waveform signal or duty cycle generated when an article having a weight equal to the maximum capacity of the load cell is sensed by the load cell.
Figure 4:
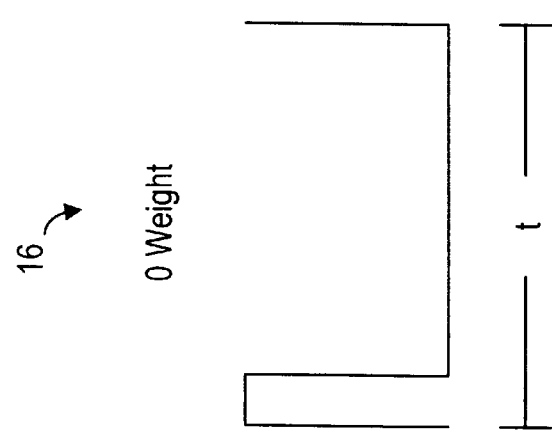
FIG. 4 is a diagram of the shape of a pulse waveform signal or duty cycle generated when no article is placed on the load cell.
Figure 3:
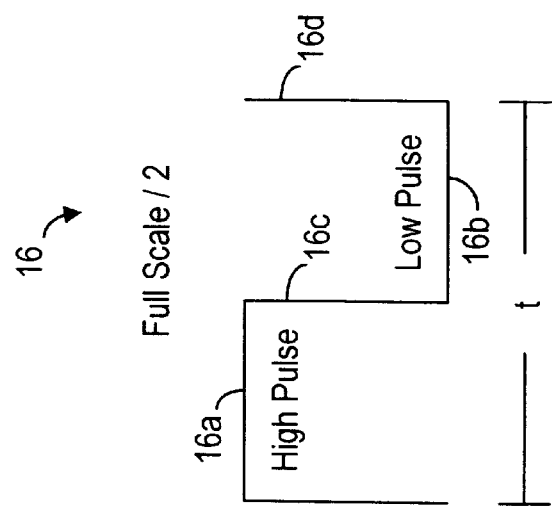
FIG. 3 is a diagram of the shape of a pulse waveform signal generated when an article having a weight of one half the capacity of the load cell is sensed by the load cell.

Thus, the pulse width modulated load cell module 12 generates a modulated output signal 16 on bus 15 to represent the weight of an object via a duty cycle as explained further below. FIGS. 3–5 show examples of modulated output signal 16 representing the weight of various objects placed on the load cell module 12. Modulated output signal 16 has a period of a fixed time duration (t) and consists of high and low pulses. The ratio of high and low pulses in the period is called the duty cycle, that is, the percentage of the high voltage segment 16a of the output signal 16, verses the percentage of the low voltage segment 16b of the output signal 16, present during time period t. FIG. 3 is a diagram of the shape of a modulated output signal 16 generated when an object (not shown) having a weight of one half the capacity of the load cell module 12 is sensed by the load cell module 12. FIG. 4 is a diagram of the shape of a modulated output signal 16 generated when an object (not shown) of zero weight, i.e., no object is sensed by the load cell module 12. FIG. 5 is a diagram of the shape of modulated output 16 generated when an object (not shown) of the maximum capacity of the load cell module 12 is sensed by the load cell module 12. Thus, the use of a pulse width modulated load cell module 12 in an overall scale 8 greatly reduces the cost and complexity of the electronics in the scale, as no additional amplifier or analog to digital converter (A/D) hardware is required.

Figure 7:
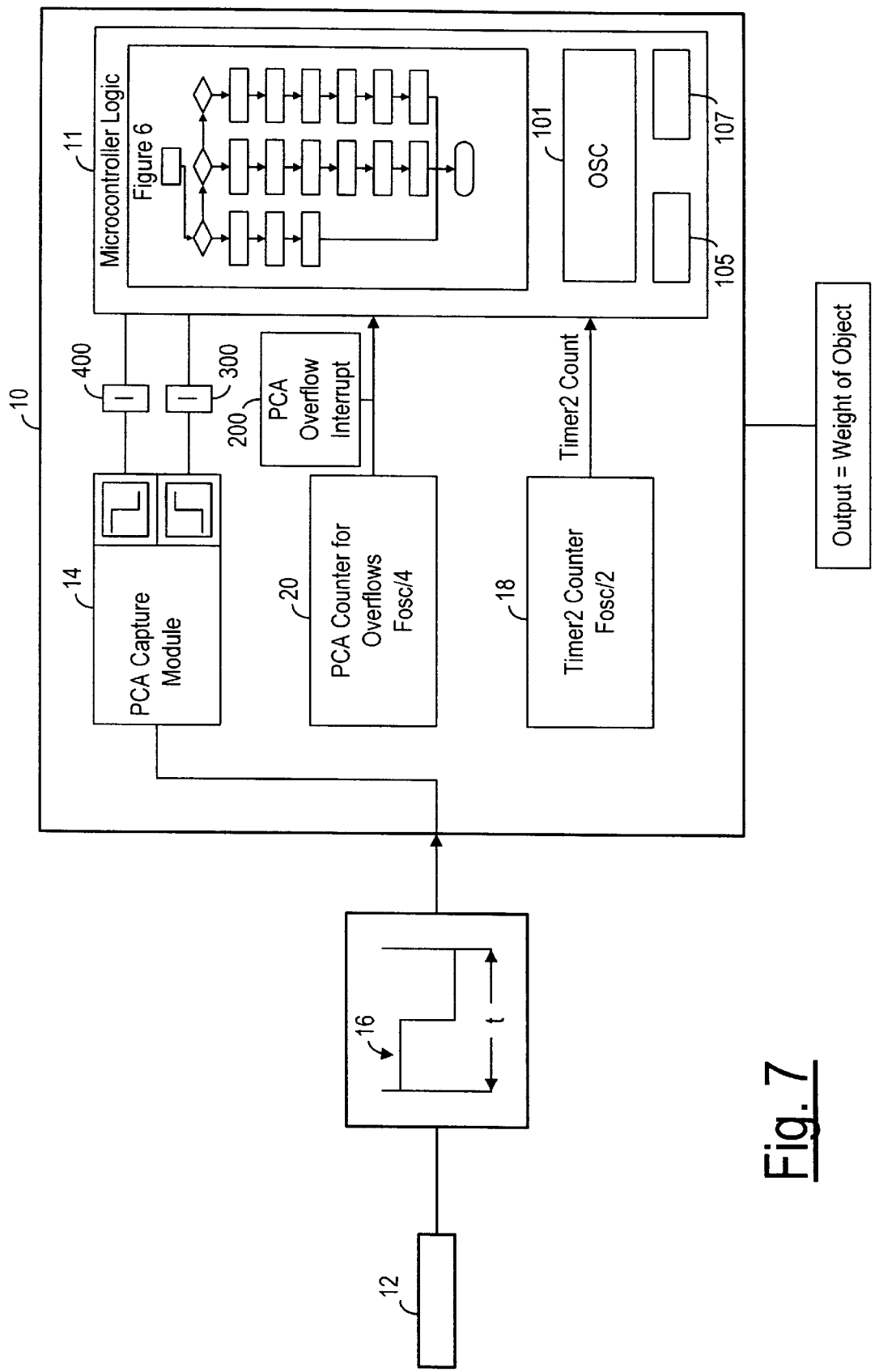
FIG. 7 is a block diagram of the preferred embodiment of a scale and its microcontroller 10 which includes PCA capture module 14, PCA counter 20, and TIMER2 counter 18.
Figure 8:
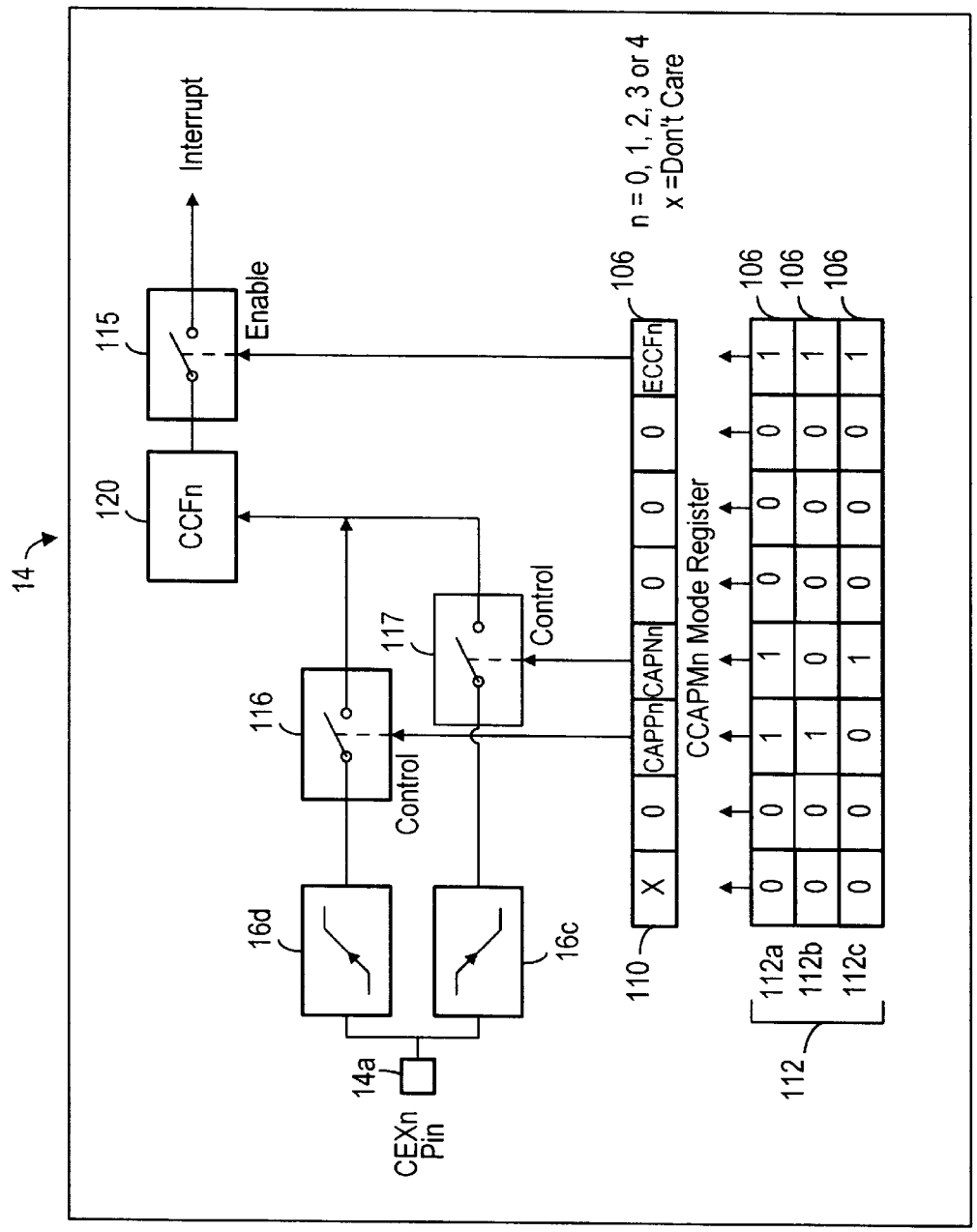
FIG. 8 is a block diagram of PCA capture module 14.

Referring to the method of the present invention, in the preferred embodiment an Intel® 8XC51FX microcontroller 10 is used. However, the invention is not limited to any specific microcontroller. Referring to FIGS. 7 and 8, the PCA capture module 14 configured to be in Capture Mode, i.e., one of its programmable operational modes, can generate an interrupt 400 on a falling edge 16c transition, or an interrupt 300 on a rising edge transition 16d from pulse width modulated load cell module 12. These interrupts 300, 400, respectively, are used to stop, store the count and overflow value from and restart shared PCA counter 114 and TIMER2 counter 18 via microcontroller software 11.

Figure 6:
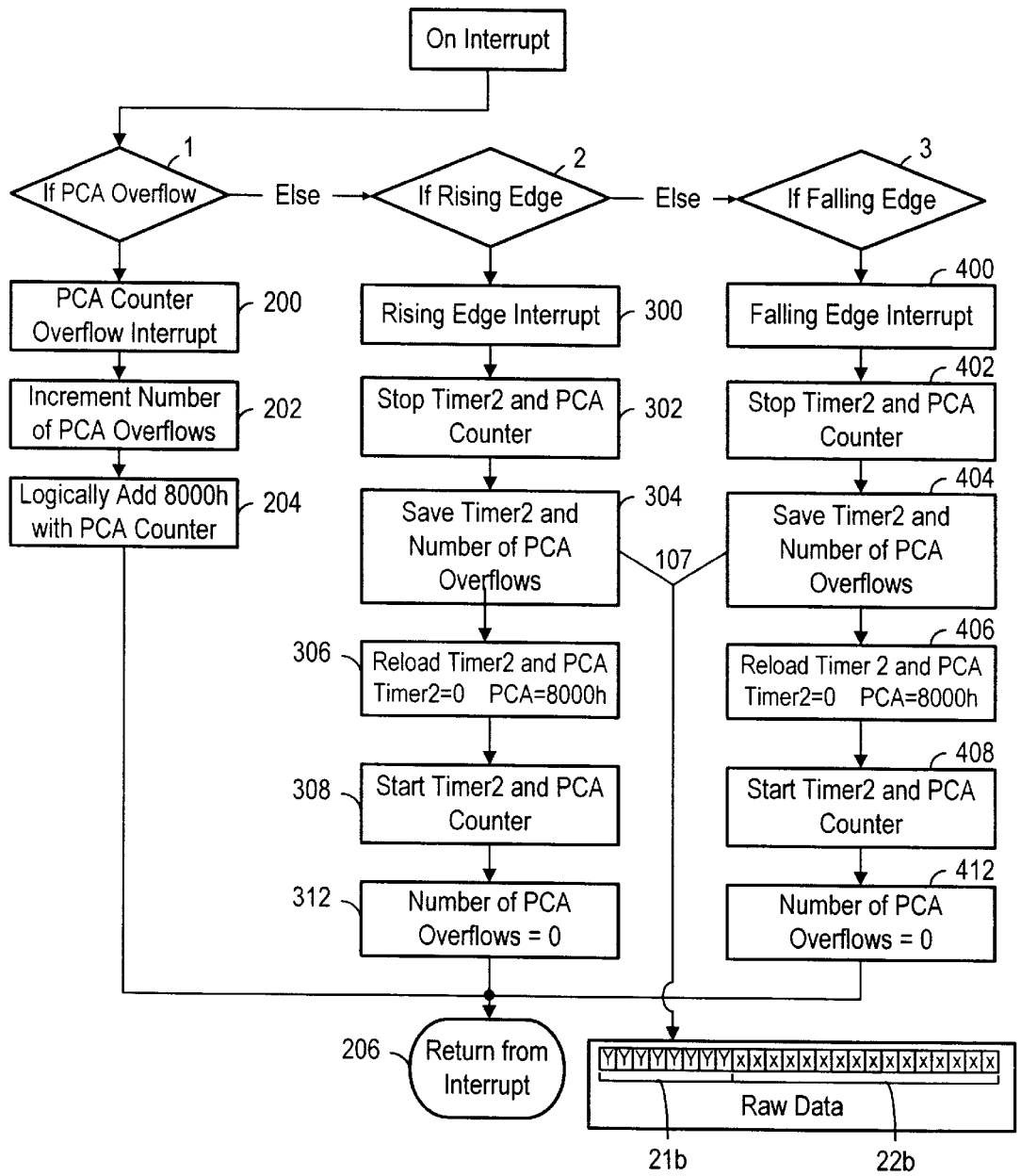
FIG. 6 is a flowchart of the method of controlling the TIMER2 counter and the PCA counter to provide high resolution processing of the output signal by the microcontroller.
Figure 11:
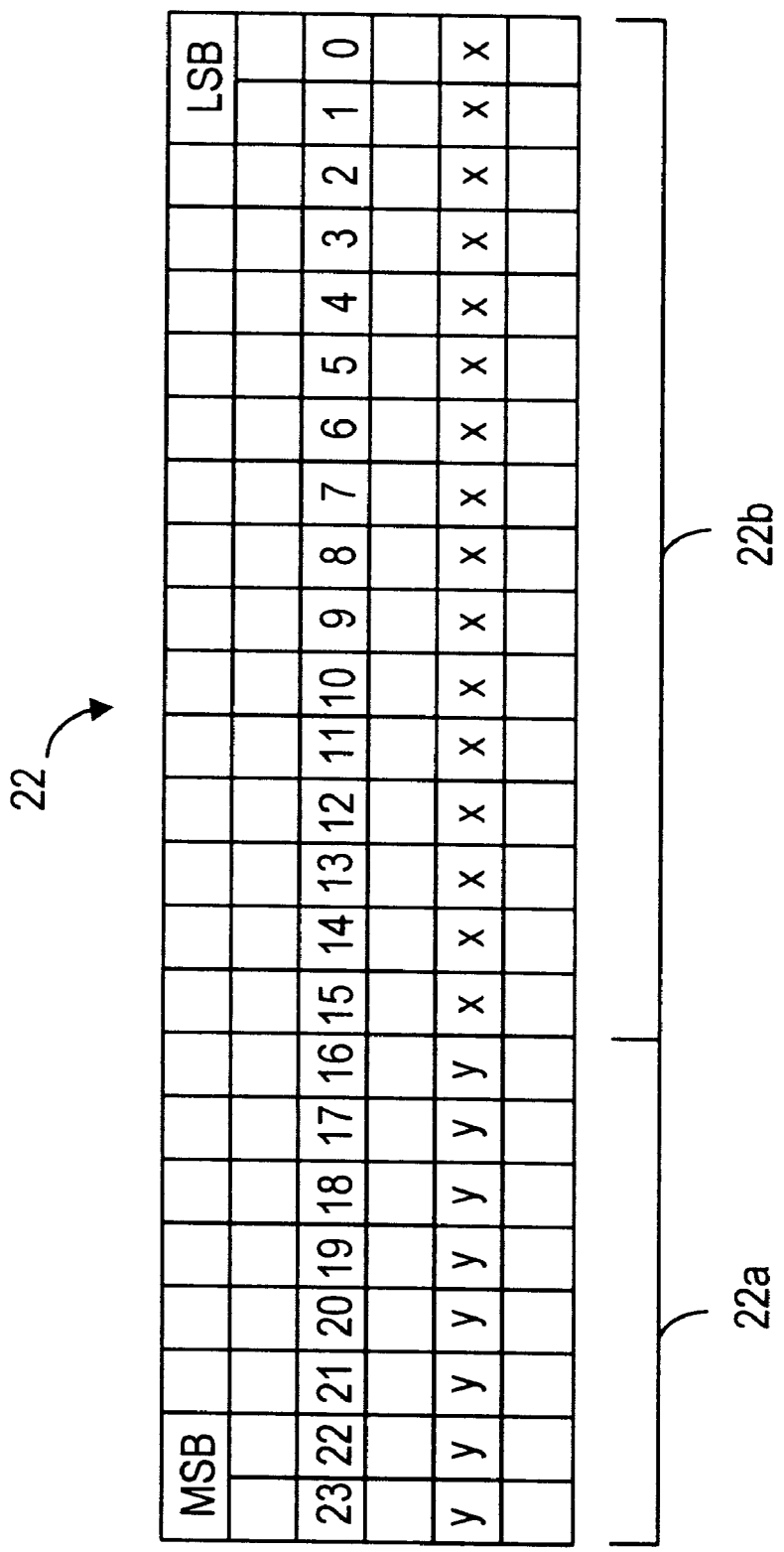
FIG. 11 is a diagram of an embodiment with a binary 24-bit data value arrangement used to generate a value representing the width of the pulse which is generated by the combination of the 16 bit value from TIMER2 counter 18 (LSB) and an 8 bit value for the number of PCA overflows (MSB) from PCA counter 20.
Figure 12:
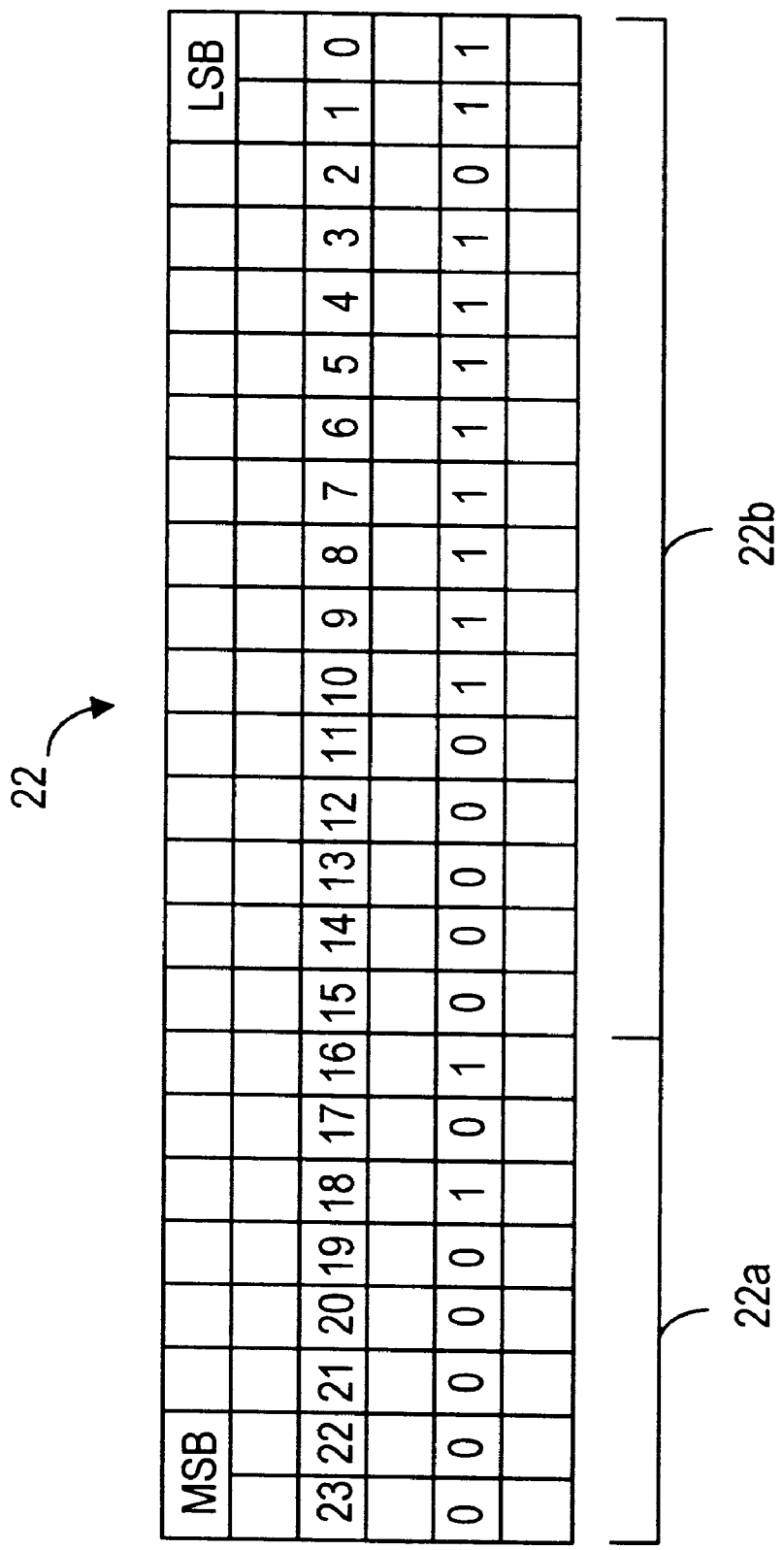
FIG. 12 is a binary diagram of an actual data value for the embodiment of FIG. 11, the value 507FB hexadecimal.

As seen in FIGS. 6, 7 and 11, TIMER2 counter 18 and PCA counter 20 are used to overflow in a synchronized manner, which in turn generates an interrupt 200 which results in incrementing the value of the number of overflows and logically adding 8000H to the PCA counter. This solves a problem related to TIMER2 counter 18. TIMER2 counter 18 in clock out mode can count at a high resolution rate which is twice as fast as the rate of PCA counter 20. However, TIMER2 counter 18 cannot interrupt on overflow, whereas the PCA counter 20 can interrupt on overflow of PCA counter 20. Therefore, the method of the present invention uses PCA counter 20 to interrupt at the same time that TIMER2 counter 18 would interrupt, if TIMER2 were capable of interrupting. Thus, the method allows the high rate, high resolution, TIMER2 counter 18 data 22b generated by TIMER2 counter 18 to be used as the first sixteen Least Significant Bits (LSB) as seen in FIGS. 11 and 12, while the number of PCA counter 20 overflows data 22a is used as the Most Significant Bits (MSB). The number of PCA counter 20 overflows equals the number of TIMER2 counter 18 overflows.

This operation which enables synchronized overflow of the two counters, i.e., PCA counter 20 and TIMER2 counter 18, can be accomplished by using the method of the invention wherein PCA counter 20 is configured to overflow at the same time as TIMER2 counter 18 overflows, by preloading the PCA counter with a pre-determined value i.e., when both 16-bit counters attempt to register the $2^{16}$ binary value at the same time. The method enables this simultaneous overflow between shared PCA counter 114 and TIMER2 counter 18 because they operate from the same clock oscillator, despite the fact that the shared PCA counter 114 operates at half the speed of TIMER2 counter 18, as discussed in detail below. Thus, by combining the high resolution data from TIMER2 counter 18, with the data from PCA counter 20 regarding the number of times the counter overflowed, a high resolution binary value 22 can be utilized to determine the weight of an object.

Figure 10:
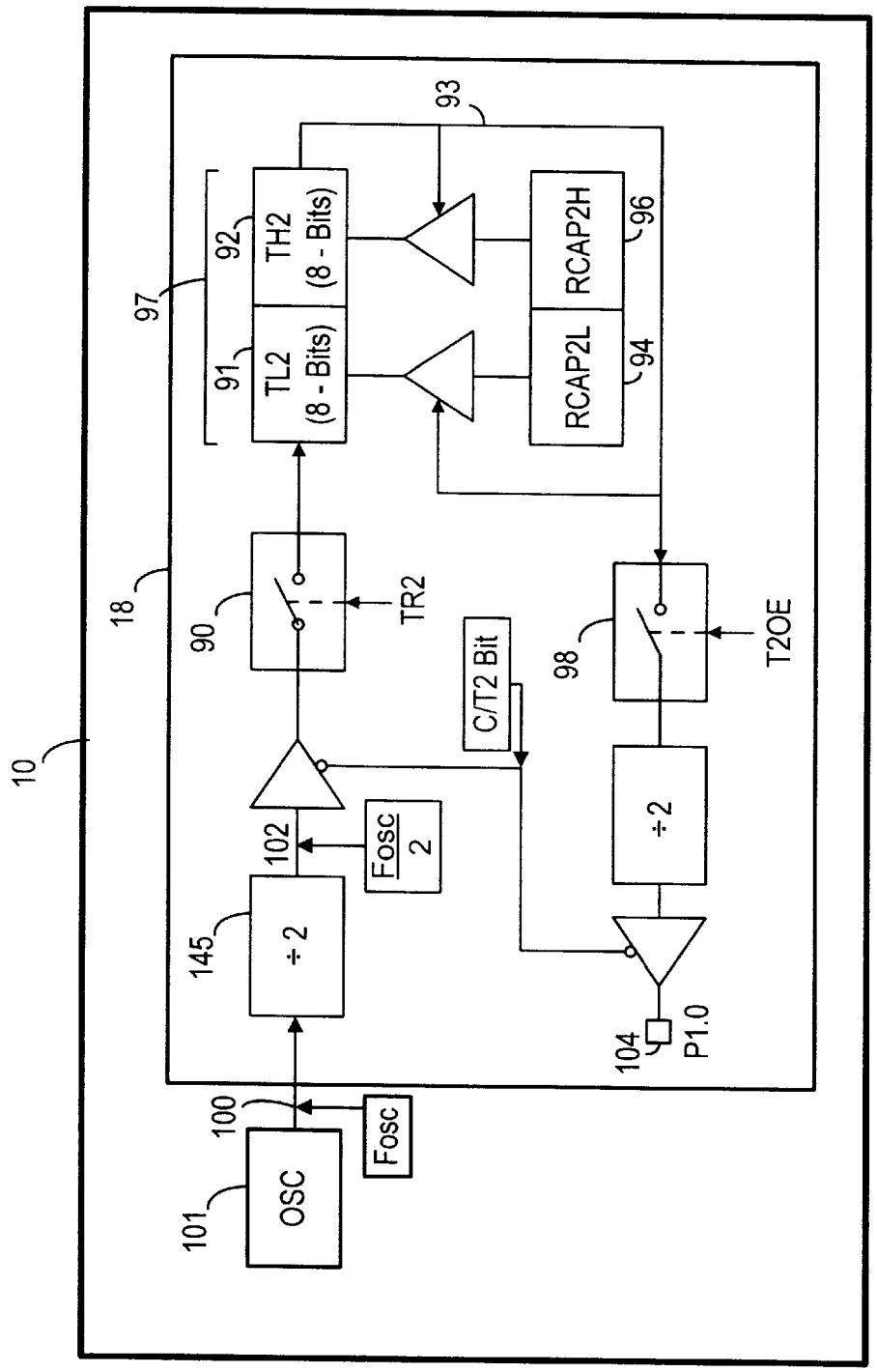
FIG. 10 is a block diagram of the TIMER2 counter 18 configured for clock-out mode.

Referring to FIGS. 7 and 10, on the 8XC51FX microcontroller 10, the fastest counter/timer is TIMER2 counter 18 configured to be in Clock-Out Mode. An oscillator 101 is connected to the microcontroller 10. TIMER2 counter 18 in Clock-Out Mode operates at a rate based on the frequency of oscillation (Fosc) of said oscillator 101 of the microcontroller 10, divided by two, or Fosc/2 102. The Fosc 100 of said oscillator 101 of the microcontroller 10 is typically 16 MHZ for such a microcontroller. Fosc/2 102 provides a high resolution rate of operation for TIMER2 counter 18 wherein the period "t" is a set time interval such as 125 nanoseconds and the period equals 1/frequency which in this case is equal to 1/(Fosc/2). However, TIMER2 counter 18 does not interrupt on overflow which occurs on the 8XC51FX microcontroller 10 when the 16-bit TIMER2 counter 18 attempts to register the binary value $2^{16}$ as represented in FIG. 11 at Ref. Num. 22b. Thus, any overflow from TIMER2 counter 18 is lost in ordinary operation, i.e., the 22a data would be lost.

According to the method of the present invention, the high resolution timer, TIMER2 counter 18, is used to increment the sixteen least significant bits 22b up to an overflow value "y". This is seen in FIG. 11 wherein the "x's" represent the TIMER2 counter 18 count data 22b. TIMER2 counter 18 overflows when trying to register the $2^{16}$ binary value, while values above said value are recorded as overflow values by the PCA counter 20. This is accomplished by PCA counter 20 generating an interrupt 200 (see FIG. 6) wherein the number of PCA counter 20 overflows is incremented. This step is represented at step 202 in FIG. 6. After the number of PCA counter 20 overflows is incremented, the shared PCA counter 114 is logically added with an additional 8000 hexadecimal to remain synchronized with TIMER2 counter 18. This operation is also seen in FIG. 6 at steps 200–206, when PCA counter 20 overflows it generates an interrupt 200. In step 202 the number of overflows from the PCA counter is ineremented. At the next step, 204, the PCA counter 20 is logically added with an 8000 hexadecimal and the Interrupt service procedure returns from interrupt at step 206. Thus, the PCA counter 20 and TIMER2 counter 18 stay synchronized because the PCA counter 20 is preset and subsequently logically added, upon interrupt at step 204, with the value 8000 hexadecimal ($2^{15}$ binary), which allows the PCA counter 20 and TIMER2 counter 18 to always overflow at the same number count and at the same time even after steps 202 and 204 have been executed. Thus, the PCA counter 120 overflows equal TIMER2 counter 18 overflows. This synchronized overflow method of operation generates a value in memory 105 which can be saved and used as the Most Significant Bits (MSB); PCA overflows data 22a, even though TIMER2 counter 18 cannot keep track of, i.e., register, the number of times TIMER2 counter 18 overflowed. Thus, when the PCA counter 20, overflow interrupt occurs the data in memory 105, i.e., the number of times shared PCA counter 20 overflows is incremented.

Therefore, by combining the functions of TIMER2 counter 18 with the functions of the PCA counter 20, the apparatus and method of the present invention provides the overall scale with the resolution of TIMER2 counter 18 and the ability to determine TIMER2 counter 18 overflows by using the PCA counter 20. Subsequently, the value 22 made up of 22b and 22a from TIMER2 counter 18 and the PCA counter 20 overflows, respectively, are combined and processed by the microcontroller 10 to determine the High or Low pulse width of the modulated output signal 16 (with high resolution) which allows the weight of an object placed on the load cell module 12 to be determined with high resolution. This method increases the resolution when using a 8XC51FX microcontroller 10, or other microcontroller which supports PCA's, to measure the pulse width modulated output signal 16 of a pulse width modulated load cell module 12.

Referring now to FIGS. 6 and 7, the method broadly introduced above will be explained further. There are three ways to generate a PCA interrupt. At reference numeral 1, the first type of interrupt 200, an interrupt triggered by the overflow of PCA counter 20, is shown. At reference numeral 2, the second type of interrupt a Rising Edge Interrupt 300 is shown. At reference numeral 3, the third kind of interrupt a Falling Edge Interrupt 400 is shown. In the preferred embodiment shown in FIG. 7, all three interrupt methods are used in conjunction with one another, although the method is not limited to this configuration.

An example of the steps shown in FIG. 6 is helpful for understanding the method. Given that an object (not shown) is placed upon the pulse width modulated load cell module 12 shown in FIG. 2, given that a modulated output signal 16 is generated by the modulated load cell module 12 which is proportional to the maximum weight handling capability of the modulated load cell module 12, and given that PCA capture module 14, PCA counter 20, and TIMER2 counter 18 are properly configured and enabled (i.e., turned on) as discussed further below, the following steps occur. As seen in FIG. 3, the modulated output signal 16 will begin in either the high voltage 16a or low voltage 16b state. In FIG. 3, for example, modulated output signal 16 begins a time interval (t) in the high voltage state 16a. As seen in FIG. 2, the modulated output signal 16 is sent along bus 15 to input pin 14a on PCA capture module 14. As seen in FIG. 7, when the modulated output signal 16 is sensed by PCA capture module 14, PCA counter 20 and TIMER2 counter 18 begin counting. The PCA counter 20 is pre-loaded with a value of 8000 hexadecimal. TIMER2 counter 18 begins at zero.

For purposes of example, it is assumed that the PCA counter 20 overflows before a rising edge 16d or a falling edge 16c transition appears in the modulated output signal 16. Then, referring to FIG. 6, overflow of the PCA counter 20 triggers a PCA counter 20 overflow Interrupt 200. It is seen that after PCA Overflow Interrupt 200 the number of overflows of PCA counter 20 is incremented 202 in a memory 105 to create PCA overflows data 22a (see FIG. 11). Next, the PCA counter 20 is logically added with an additional value of 8000 hexadecimal 204. Next, the interrupt service procedure exits at 206. TIMER2 counter 18 and PCA counter 20 do not stop counting upon PCA Counter 20 Overflow Interrupt 200. However, TIMER2 does overflow at the same time, as PCA counter 20 because both have been pre-set to overflow at the same time.

Referring now to reference numeral 2 and to the second possible way in which an interrupt may occur, the Rising Edge Interrupt 300 generated by the PCA capture module 14, and following steps (302–312), are shown in FIG. 6. When a rising edge 16d in modulated output signal 16 is sensed by the PCA capture module 14 (see FIG. 7), and the PCA capture module 14 is configured to sense rising edges 16d as discussed further below in reference to FIG. 8, a Rising Edge Interrupt 300 occurs. Next, at step 302, TIMER2 counter 18, and PCA counter 20, are stopped from counting. Next, the count data 22b from TIMER2 counter 20, which is 16-bit data, is saved at step 304 with the PCA overflow count from memory 105 and saved in Low Data in memory 108. Next, at step 306, TIMER2 counter 18 is reloaded with the value of zero and PCA counter 20 is reloaded with the value 8000 hexadecimal in order to synchronize the overflows of TIMER2 counter 18 which counts at the rate of Fosc/2 102 and PCA counter 20 which counts at the rate of Fosc/4. Next, at step 308, TIMER2 counter 18 and shared PCA counter 20 are restarted. Next, at step 312, the number of PCA counter 20 overflows in memory 105 is reset to. At, step 206 interrupt service procedure returns from interrupt.

Referring now to reference numeral 3, the Falling Edge Interrupt 400 of FIG. 7, the third possible way that an interrupt may occur is when the PCA capture module 14 senses a falling edge 16c (see FIG. 3) which triggers a Falling Edge Interrupt 400. Similar steps as described above in reference to the Rising Edge Interrupt 300 and steps 302–312, occur in steps 402–412 for a falling edge 16c except that the the combined value of the timer2 counter and the number of PCA overflows from memory 105 is saved in High data 107. Next, at step 412, the number of PCA counter 20 overflows is set to zero, in identical fashion to step 312 described above. Lastly, at step 206, interrupt service procedure-return from interrupt.

Referring now to FIG. 8, the configuration of PCA capture module 14 will be explained. FIG. 8 shows the possible configuration of the PCA capture module 14 in detail in the preferred embodiment (112a) although other embodiments (112b, 112c) are possible. The configuration options are set by an 8 bit code 112a, 112b, or 112c in a mode register 110. For example, code 112a enables both rising edge transitions 16d via switch 116, and falling edge transitions 16c via switch 117, to enable the PCA capture event flag 120 on PCA capture module 14. Alternatively, code 112b enables rising edge 16d transitions to enable the PCA capture event flag 120 via switch 116, and code 112c enables falling edge transitions 16c to enable the PCA capture event flag 120 via switch 117. The last bit 106 is the enable capture interrupt bit (ECCF$_n$), and in all configurations shown, i.e., 112a, 112b, 112c, it is enabled. Thus, the PCA in capture module 14, is configured to genterate an interrupt, i.e., either step 300 or 400 as seen in FIGS. 6 and 7, via switch 115. The interrupt is signalled by the module's event flag (CCF$_n$) 120, which is triggered by a rising edge 16d or falling edge 16c, depending how it is configured.

Figure 9:
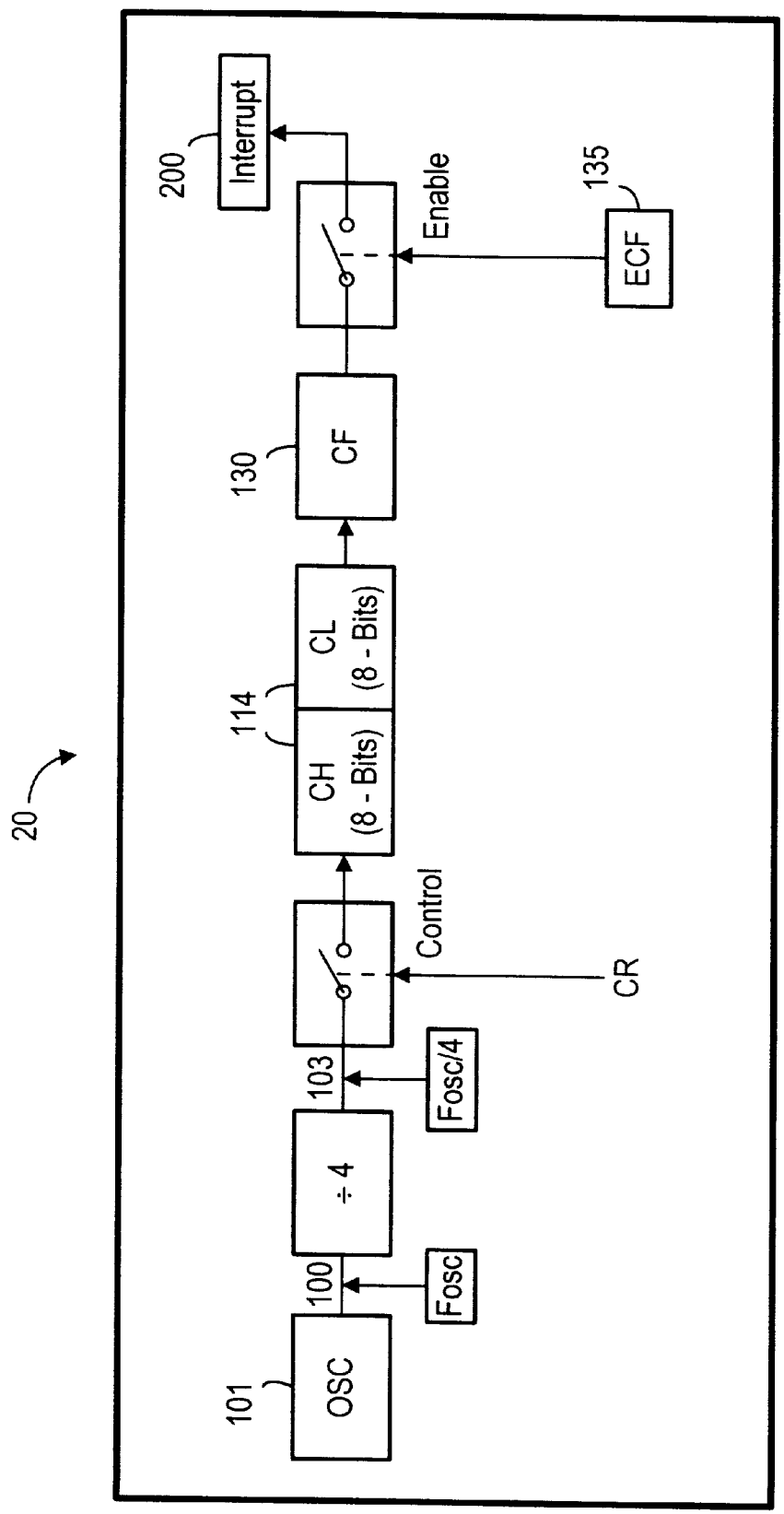
FIG. 9 is a block diagram of PCA counter 20.

Referring to FIG. 9, PCA counter 20 is shown in detail. Oscillator 101 provides the Fosc 100 signal. Divider 146 divides Fosc 100 by four (÷4) and sends Fosc/4 103 to shared PCA counter 114. Event flag (CF) 130 is enabled when shared PCA counter 114 overflows. The ECF bit 135 is part of the mode register CMOD (not shown) for PCA capture module 14. ECF 135 enables the shared PCA 16-bit counter 114 to interrupt 200 upon overflow, i.e., when register CH overflows in shared PCA counter 114.

Referring to FIG. 10, TIMER2 counter 18 is shown as part of microcontroller 10. Oscillator 101 is also shown. The signal from oscillator 101, Fosc 100, is input to TIMER2 counter 18. The signal is divided by two (÷2) at divider 145 which generates Fosc/2 102 signal. TR2 switch 90 turns on and off the 16-bit counter 97 made up of 8-bit registers TL2 91 and TH2 92. Bit T2OE configures TIMER2 counter 18 to be in clock out mode, i.e., its fastest counting mode. The contents of counter 97, is a 16-bit, high resolution, value. This value becomes TIMER2 counter 18 count data 22b which is used as the last sixteen bits of binary data value 22. This data format 22 is what is saved as High data or Low data and used to compute the raw data representing the weight of the object placed upon the loadcell. This raw data is further processed by software to become the actual weight data to be processed by microcontroller 10 and may be ultimately displayed by a display 150 or stored for other use.

As described in detail above, the present invention provides a highly accurate, relatively low cost, and relatively non-complex apparatus and method for a high resolution electronic scale for weighing objects.

Therefore, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. An electronic scale for weighing an object placed thereon, the electronic scale comprising:

(a) a load cell with terminals for providing an output voltage proportional to the weight of the object placed on the load cell;

(b) a pulse width modulated signal generator responsive to the output voltage from the load cell so as to generate a pulse width modulated output signal responsive to said output voltage; and (c) a microcontroller responsive to the pulse width modulated output signal generated by the pulse generator so as to generate a weight data having a value proportional to the duty cycle of the pulse width modulated output signal wherein, the microcontroller includes programmable timer/counter arrays (PCAs) to time the pulse width modulated output signal used by the microcontroller to generate the weight data and a memory for the storage of a number of count overflows, wherein the microcontroller includes a first high resolution timer/counter and a second timer/counter, the first timer/counter is clocked to count at a faster rate than the second timer/counter, wherein the second timer/counter is preset with a predetermined count value so that it overflows at the same count value as the first timer/counter, wherein the number of overflows of the second timer/counter are stored in said memory.

2. A scale as defined in claim 1 wherein the first and second timer/counters are stopped and the values saved upon a transition of the pulse width modulated output signal.

3. The scale of claim 2 wherein:

(a) the microcontroller is an Intel® 8XC51FX based microcontroller.

4. A method for determining the weight of an article placed on a load cell comprising the steps of:

(a) placing an article on the load cell to generate an analog signal from the load cell which is proportional to a weight of the article;

(b) sending the analog signal to a pulse width modulated signal generator which directly converts the analog signal to a pulse width modulated signal which is readable by a microcontroller, said pulse width modulated signal having a duty cycle proportional to the analog signal, said pulse width modulated signal generated without amplification or use of an analog to digital converter;

(c) wherein the pulse width modulated signal contains rising edges and falling edges which form a duty cycle proportional to the weight of the article placed on the load cell;

(d) sending the pulse width modulated signal to a Programmable Counter Array (PCA) capture module of a microcontroller to enable a first timer/counter and a second timer/counter in the microcontroller;

(e) setting the first timer/counter and the second timer/counter to operate at different rates wherein the first timer/counter operates at a rate which is faster and has higher resolution than the second timer/counter;

(f) presetting the second timer/counter to a specific value such that it experiences overflow at the same time that the first timer/counter experiences overflow in a synchronized manner;

(g) starting the time/counters upon detection of a rising edge or a falling edge by the Programmable Counter Array (PCA) capture module;

(h) interrupting upon overflow of the second timer/counter, incrementing an overflow count value of the second timer/counter in a memory, logically adding a synchronization value to the second timer to enable the second timer to remain synchronized with the first timer;

(i) interrupting upon detection of a subsequent rising edge or a subsequent falling edge by the Programmable Counter Array (PCA) capture module;

(j) combining the overflow count value of the second timer/counter with the value from the first timer/counter to form a high resolution value representing the width of the High or Low portion of the pulse width modulated signal; and (k) converting the high resolution value in the microcontroller to a weight value for the article placed on the load cell.

5. The method of claim 4 wherein the microcontroller operates at a predetermined frequency of oscillation (Fosc) wherein:

(a) the second timer/counter operates at the rate of Fosc divided by 4 (Fosc/4), and (b) the first timer/counter operates at the rate of Fosc divided by 2 (Fosc/2).

* * * * *